March 5, 1957 — D. GRINGER — 2,783,537
ROTATIVELY ADJUSTABLE SCRAPER
Filed Oct. 31, 1955
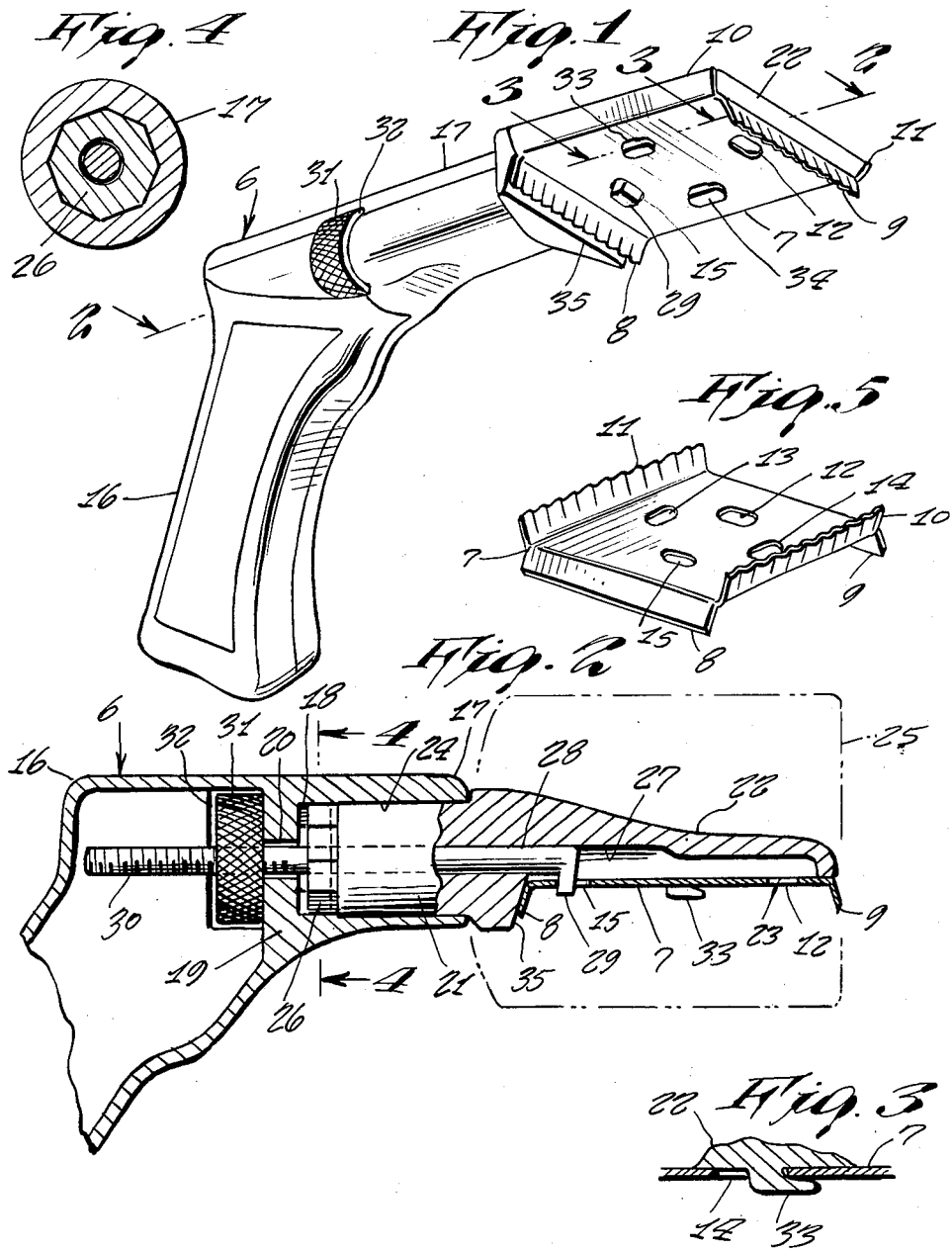
INVENTOR.
DONALD GRINGER
BY
Carl Miller
ATTORNEY

United States Patent Office 2,783,537
Patented Mar. 5, 1957

2,783,537

ROTATIVELY ADJUSTABLE SCRAPER

Donald Gringer, New York, N. Y., assignor to Louis Gringer, New York, N. Y.

Application October 31, 1955, Serial No. 543,720

7 Claims. (Cl. 30—320)

This invention relates to hand scrapers and like tools, and particularly to what I choose to term a rotary scraper.

The main object of my invention is to provide a hand scraper that it rotatably adjustable to different angular positions with respect to the handle thereof.

Another object of my invention is to provide a scraper that is reversible and also invertible for utilizing any one a number of scraping edges thereof.

A further object of the invention is to have a scraper provided with a handle having means for firmly securing the scraper proper in any selected position.

A practical object is to have such a scraper wherein the scraper proper has openings adapted to be engaged by securing means for attaching it to a special handle by which to manipulate the scraper during use thereof.

It is also an object to have a scraper of the character indicated which is simple to make and simple to use and adjust in order to provide a convenient and reliable tool that will endure severe use and considerable pressure.

It is, of course an object to have a scraper such as mentioned that is reasonable in cost to encourage wide adoption by the trade generally.

Other objects and advantages of my invention will appear in further detail as the specification proceeds.

In order to facilitate ready comprehension of this invention for a proper appreciation of the salient features thereof, the invention is illustrated on the accompanying drawing forming part hereof, and in which:

Figure 1 is a bottom perspective view of a rotary scraper made according to my invention and embodying the same in a practical form;

Figure 2 is a longitudinal vertical section of the scraper as taken on line 2—2 in Figure 1;

Figure 3 is a fragmentary section of the scraper as taken on line 3—3 in Figure 1;

Figure 4 is a transverse section of the handle of the scraper as taken on line 4—4 in Figure 2; and Figure 5 is a perspective view of the scraper proper of the tool as seen alone.

Throughout the views, the same reference numerals indicate the same or like parts and features.

Mechanics and expert workmen require not only good tools but special and very convenient tools which make perfect work natural and certain, and this is true even of scrapers. Such tools need securely held scraper blades and several scraping edges and convenient grips for holding the scrapers in various desired positions to effect different scraping operations. However, such requirements form a problem not solved by conventional scrapers.

Upon considering this problem, it has occurred to me that a scraper should have a special handle and blade with rotatably adjustable means for setting the scraper blade at different angular positions and firmly securing it in attained position at will. As a result of such consideration, I have succeeded in producing a rotary scraper along the lines already indicated which will now be decreased in detail in the following.

Hence, in the practice of my invention, the scraper generally indicated at 6 primarily includes a scraper blade 7 having two opposite depending scraping edges 8 and 9 and two other mutually opposed upwardly extending scraping edges 10 and 11. The intermediate area of the scraper blade has a plurality of apertures 12, 13, 14 and 15, each having a double use and being disposed within one of the scraping edges.

For supporting the scraper blade, a handle 16 has a forwardly projecting hollow extension 17 which is generally cylindrical within but at the inner end has a hexagonal or octagonal section 18 terminating at a rear partition wall 19 provided with a central hole 20. Into the hollow extension 17 is fitted the shank 21 of a blade holder 22 with a substantially flat supporting surface 23 against which the blade 7 is adapted to lie with the forward scraping edge extending into operative position at 9. The inner end of shank 21 is hexagonal or octagonal in shape to correspond to the section 18 of the cylindrical chamber 24 into which the shank extends and fits in the section 18 in any one of a number of different angular positions. With the scraper blade in position upon the holder 22, the latter may occupy the position of its shank in handle extension 17 shown in Figures 1 and 2, but any partly rotated position may be used, as for example indicated in broken lines at 25 in Figure 2, due to the many sides of the inner end 26 of shank 21 fitting in end section 18 of the handle.

In order to secure the scraper blade in place upon the holder, the latter has a longitudinal opening 27 through shank 21 occupied by a tension rod 28 having a depending tension hook 29 upon its forward end and a threaded rear end 30 upon which is mounted a knurled nut 31 rearwardly of wall 19 and being exposed at the sides of handle 16 for access thereto through side slots 32, 32, in said handle. Beneath the supporting surface 23 of holder 22 are fixed a pair of retaining hooks 33, 34 which are preferably tapered to readily enter the two side apertures 13 and 14 of the scraper blade, while tension hook 29 enters aperture 15, for example. When nut 31 is rotated sufficiently to tighten the tension hook and draw the blade 7 until the blade is suspended between hooks or brackets 33, 34 and hook 29, with rear scraping edge 8 substantially resting against abutment 35 of holder 22, the scraper blade will be securely held upon the holder so that handle 16 may be used to manipulate the tool and scrape by means of forward edge 9.

By merely loosening the nut 31, the holder may be slid out a little to rotate the shank 21 and its rear polygonal end 26 to fit in a different angular position in rear end section 18, after which the knurled nut may be tightened again. On the other hand, the blade 7 may be reversed to place edge 8 forward, by loosening the hook 29 by unscrewing the nut, and when the blade has thus been shifted to engage the hook with hole 12 and the retaining hooks or brackets 33, 34 engaged in holes 13 and 14, leaving hole 15 free. The scraper is also invertible to bring edge 10 or edge 11 forward by inverting it and securing it by means of hooks 33, 34 and tension hook 29 in three of the four apertures in the scraper blade, always using the two apertures at the sides for the retaining hooks 33, 34 and the aperture nearest the handle for the tension hook. The result is the same in every case, no matter which scraping edge is to be used, as the four holes or apertures are arranged in the same way with respect to all of the scraping edges and three are used for holding the blade in place for any edge selected.

There are no loose parts of the handle to be lost, due to the arrangement of the tension rod and knurled nut and the captive connection of the blade holder to handle 16, and only the scraper blade is fully releasable for replacement or shifting position.

Manifestly, variations may be resorted to, and parts and features may be modified or used without others within the scope of the appended claims.

Having now fully described my invention, I claim:

1. A rotatably adjustable scraper of the character described, including a scraper blade with a forwardly disposed scraping edge and having a plurality of apertures intermediate the edges thereof, a handle for the blade comprising a handle proper with a hollow extension, a blade holder having a surface portion for receiving the blade thereon, projections upon the blade holder for engaging in at least two apertures in said blade, a shank upon the blade holder fitting adjustably in the hollow extension of the handle, means for retaining the blade engaged with the projections upon said blade holder, the inner end of the blade holder shank having a polygonal section while the inner end of the hollow handle extension is correspondingly polygonal in section to allow various angular relative positions of the shank with respect to the handle extension, and means for retaining the blade holder and blade in any attained position upon said handle.

2. A rotatably adjustable scraper according to claim 1, in which the holder shank has an opening therethrough with a tension rod slidably extending through the shank and terminating at one end in a tension hook adapted to engage in one aperture of the scraper blade, and means for shifting the tension hook to place the blade under tension to secure it to the holder.

3. A rotatably adjustable scraper according to claim 2, in which the projections upon the blade holder are two stationary retaining hooks directed in the opposite direction to that of the tension hook, and the means for shifting the latter include a thread on the tension rod and a knurled adjusting nut mounted on the thread.

4. A rotatably adjustable scraper according to claim 3, in which the knurled adjusting nut is exposed upon the handle to be accessible for manipulation, and the handle has side slots through which the nut is manually accessible.

5. A rotatably adjustable scraper according to claim 4, in which the blade holder has an abutment for the edge of the blade opposite and remote from the forward scraping edge.

6. A rotatably adjustable scraper according to claim 5, in which the blade has at least two opposite scraping edges and four apertures therein for engagement of three apertures at any one time by the retaining hooks and the tension hook.

7. A rotatably adjustable scraper according to claim 6, in which the blade has two opposite scraping edges extending in the same general direction from the blade and two other mutually opposite scraping edges at substantially right angles to the first two edges and disposed in generally the opposite direction to that of said first two scraping edges.

References Cited in the file of this patent

UNITED STATES PATENTS

| | | |
|---|---|---|
| 158,830 | Buterworth | Jan. 19, 1875 |
| 1,729,279 | Shinn | Sept. 24, 1929 |
| 2,286,190 | Abrahamsen | June 16, 1942 |
| 2,400,929 | Hein | May 28, 1946 |